US011368233B2

(12) United States Patent
Larsson et al.

(10) Patent No.: US 11,368,233 B2
(45) Date of Patent: *Jun. 21, 2022

(54) MECHANISMS FOR REPORTING A FAULTY ANTENNA PORT

(71) Applicant: Telefonaktiebolaget LM Ericsson (publ), Stockholm (SE)

(72) Inventors: Erik Larsson, Linköping (SE); Mattias Frenne, Uppsala (SE); Bo Göransson, Sollentuna (SE); Fredrik Ovesjö, Älvsjö (SE); Paul Peter Von Butovitsch, Djursholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,961

(22) Filed: Nov. 11, 2020

(65) Prior Publication Data

US 2021/0075524 A1 Mar. 11, 2021

Related U.S. Application Data

(63) Continuation of application No. 15/517,380, filed as application No. PCT/SE2017/050174 on Feb. 23, 2017, now Pat. No. 10,855,384.

(51) Int. Cl.
*H04B 17/17* (2015.01)
*H04B 17/10* (2015.01)
(Continued)

(52) U.S. Cl.
CPC ........... *H04B 17/17* (2015.01); *H04B 17/102* (2015.01); *H04B 17/24* (2015.01); *H04B 17/318* (2015.01);
(Continued)

(58) Field of Classification Search
CPC ...... H04B 17/00; H04B 17/17; H04B 17/101; H04B 17/102; H04B 17/103;
(Continued)

(56) References Cited

U.S. PATENT DOCUMENTS 6,114,955 A 9/2000 Brunius et al.
9,531,605 B2 12/2016 Ramachandra et al.
(Continued)

FOREIGN PATENT DOCUMENTS

CN 105517042 A 4/2016
CN 105978677 A 9/2016
(Continued)

*Primary Examiner* — Thanh C Le
(74) *Attorney, Agent, or Firm* — Coats + Bennett, PLLC

(57) ABSTRACT

There is provided mechanisms for reporting a faulty antenna port at a transmitting radio device. A method is performed by a receiving radio device. The method comprises receiving at least one reference signal transmitted at an antenna port of the transmitting radio device. The method comprises determining whether the antenna port is deemed faulty or not by subjecting the at least one reference signal to an evaluation criterion. The method comprises transmitting, when the antenna port is deemed faulty, a report to the transmitting radio device. The report indicates that the antenna port is deemed faulty.

20 Claims, 7 Drawing Sheets

(51) Int. Cl.
*H04B 17/24* (2015.01)
*H04L 27/26* (2006.01)
*H04B 17/318* (2015.01)
*H04L 5/00* (2006.01)

(52) U.S. Cl.
CPC .......... *H04L 5/0023* (2013.01); *H04L 5/0048* (2013.01); *H04L 27/2613* (2013.01)

(58) Field of Classification Search
CPC .... H04W 24/08; H04L 1/0003; H04L 1/0009; H04L 1/0618
See application file for complete search history.

(56) References Cited

U.S. PATENT DOCUMENTS

| | | |
|---|---|---|
| 9,929,782 B2 | 3/2018 | Andre et al. |
| 10,334,452 B2 | 6/2019 | Lee et al. |
| 2006/0197538 A1* | 9/2006 | Leinonen ............... H04B 17/19 324/533 |
| 2008/0267056 A1 | 10/2008 | Aryanfar et al. |
| 2012/0213056 A1 | 8/2012 | Aldana et al. |
| 2012/0225625 A1 | 9/2012 | Asplund et al. |
| 2012/0306521 A1* | 12/2012 | Nickel ..................... H01L 21/00 324/754.03 |
| 2014/0036796 A1 | 2/2014 | Etemad et al. |
| 2014/0194113 A1* | 7/2014 | Ahlstrom ............... H04W 24/08 455/423 |
| 2015/0319109 A1* | 11/2015 | Ranson ..................... H04L 1/06 370/242 |
| 2016/0337054 A1 | 11/2016 | Long et al. |
| 2017/0311193 A1 | 10/2017 | Jiang et al. |
| 2018/0038903 A1* | 2/2018 | Pascolini ................. G01R 29/10 |
| 2018/0159638 A1* | 6/2018 | Awadin ..................... H01Q 21/08 |
| 2021/0278451 A1* | 9/2021 | Murakami ............. H04B 17/16 |
| 2021/0281334 A1* | 9/2021 | Li ........................ H04L 25/0226 |

FOREIGN PATENT DOCUMENTS

| | | |
|---|---|---|
| EP | 3125438 A1 | 2/2017 |
| WO | 2010087749 A1 | 8/2010 |
| WO | 2013142498 A1 | 9/2013 |

\* cited by examiner

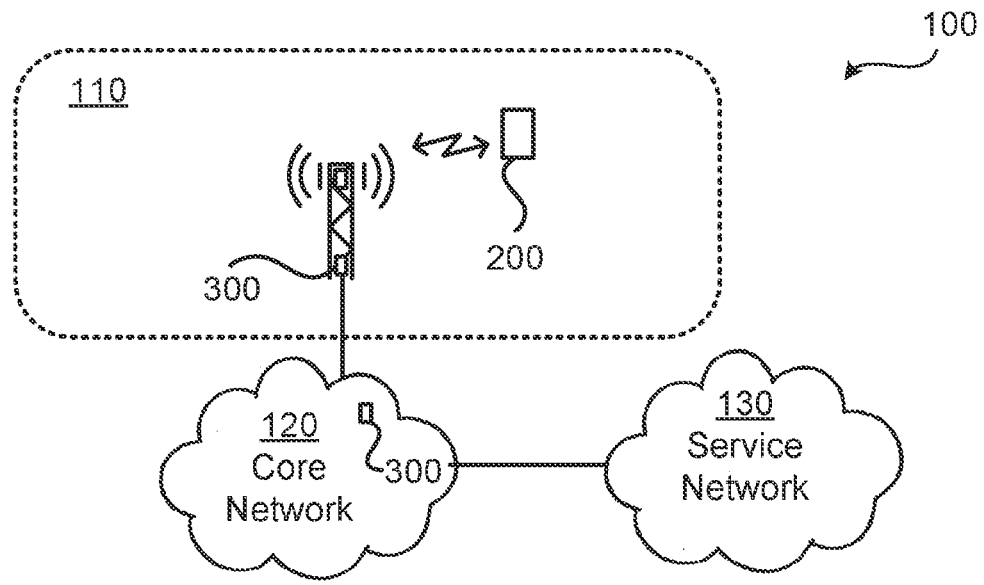
Fig. 1
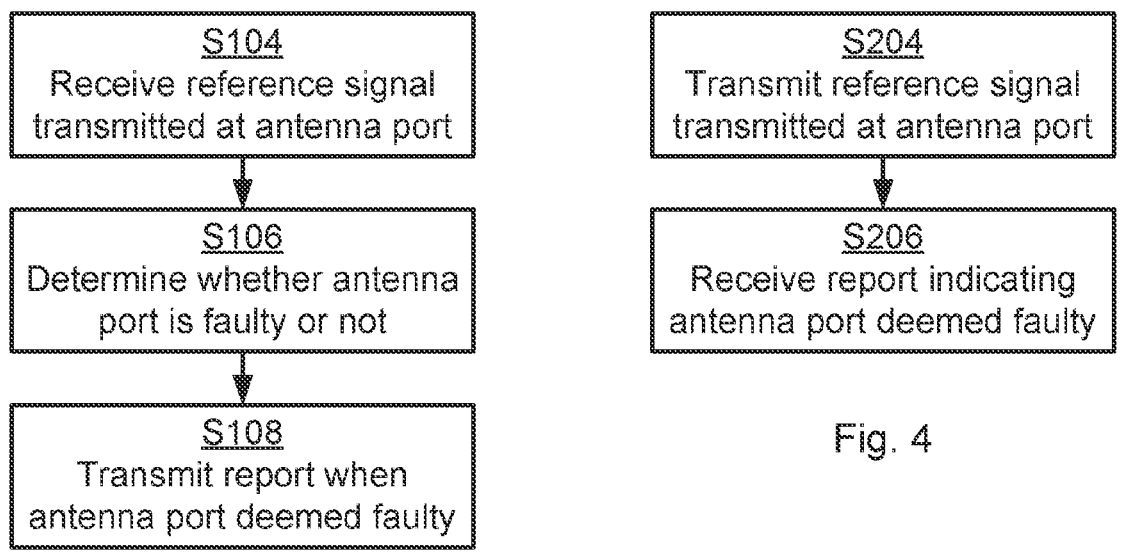
Fig. 2
Fig. 4

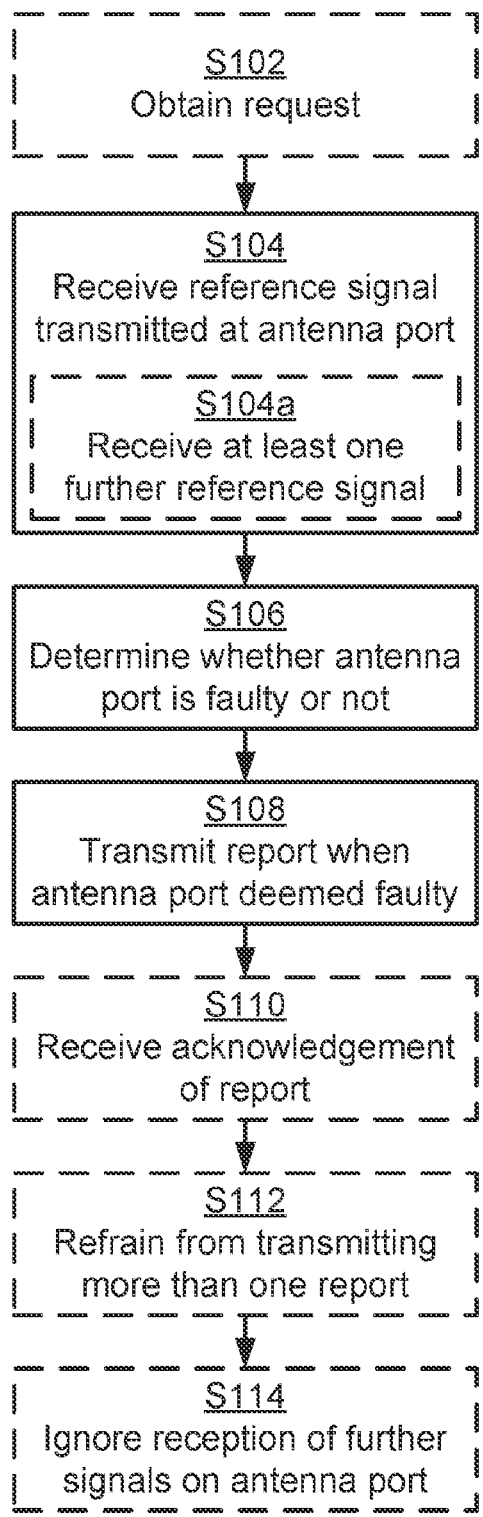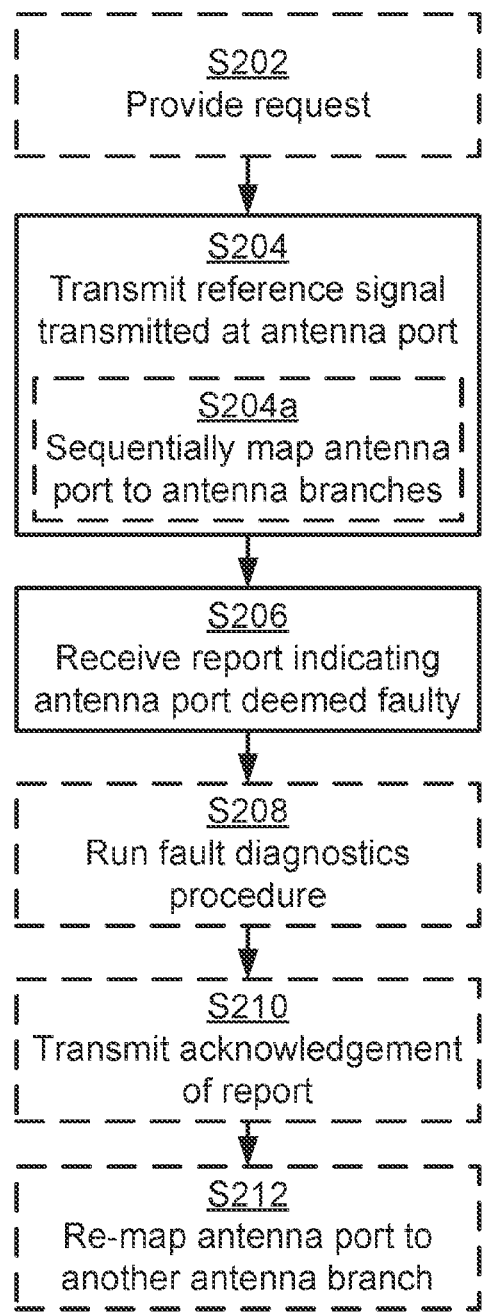
Fig. 3
Fig. 5

MECHANISMS FOR REPORTING A FAULTY ANTENNA PORT

RELATED APPLICATIONS

This application is a continuation of prior U.S. application Ser. No. 15/517,380 filed 6 Apr. 2017, which was the National Stage of International Application PCT/SE2017/050174 filed 23 Feb. 2017, the entire disclosure of each being hereby incorporated by reference herein.

TECHNICAL FIELD

Embodiments presented herein relate to a method, a radio device, a computer program, and a computer program product for reporting a faulty antenna port at a transmitting radio device. Embodiments presented herein further relate to a method, a transmitting radio device, a computer program, and a computer program product for receiving reporting of a faulty antenna port at the transmitting radio device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to detect and handle faulty equipment. Compared to a traditional radio unit (RU) deployment with few antenna branches, this issue becomes more difficult to handle for Advanced Antenna Systems (AAS) with large antenna arrays.

In general terms, AAS has the potential to significantly increase the network capacity and enhance end-user perception compared to traditional RUs by facilitating efficient use of advanced spatial-processing techniques such as multi-user multiple input multiple output (MU-MIMO) and beamforming. AAS can be defined in many ways, but can, in general, be said to facilitate efficient alternatives to map communication resources into space according to dynamic needs. The performance of an AAS depends on many characteristics, such as the antenna array design, implementation aspects, configured software features and deployment scenarios. One attribute of an AAS is the number of supported antenna ports, or radio chains. This describes, among other, the degree of digitally beamforming, i.e. essentially how many different signals that can be fed to the antenna system with individual complex weighting.

The tight integration of antenna unit and radio unit in AAS makes it challenging to isolate faults and typically gives a less robust building practice. In fact, it is often claimed that large-scale AAS can rely on the law of large numbers and thereby achieve similar or better performance than current antenna systems with relaxed radio implementation requirements and therefore cheaper and less robust components. Also, due to the law of diminishing returns, it is clear that the performance impact of one faulty antenna branch for a traditional small-scale (e.g. two or four antenna branches) antenna system is much more severe compared to one faulty antenna branch for a large-scale AAS (e.g., 64, 128, or even more antenna branches).

A traditional small-scale antenna system is typically deemed faulty and in need of replacement as soon as at least one of the antenna branches breaks down. This approach might not be viable for large-scale AAS deployments, which might be able to continue to operate with one or a few faulty branches, and existing fault handling mechanisms may therefore not be appropriate for AAS.

Another issue with AAS with large antenna arrays concerns regulatory and performance requirements. In general terms, to be classified as a 5G system and approved for deployment, the AAS needs to fulfill a set of requirements. Evidently, the AAS needs to be designed and built such that all relevant requirements are satisfied. However, typically, for cost saving reasons, the margins for fulfilling the requirements are not very large. Hence, if a few antenna branches become faulty, there is a risk that some of the requirements may be violated. In some cases, depending on requirement and use-case, this might allow the AAS still to be used, whereas in other cases allowing the AAS still to be used might be directly dangerous.

It is, in general, not feasible to label a large-scale AAS as completely faulty, or broken, and in need of replacement due to a single or few faulty antenna branches. This will be too costly and too cumbersome; it is in many cases difficult to replace AAS components at site. Still, it is important to ensure that performance is kept sufficiently good (as good as possible) all the time, even though there is faulty antenna hardware. Existing fault handling mechanisms do not include any tailored solutions for handling this issue.

Hence, there is a need for improved fault handling mechanisms, especially those that are suitable for AAS.

SUMMARY

An object of embodiments herein is to provide efficient fault detection of a transmitting radio device.

According to a first aspect there is presented a method for reporting a faulty antenna port at a transmitting radio device. The method is performed by a receiving radio device. The method comprises receiving at least one reference signal transmitted at an antenna port of the transmitting radio device. The method comprises determining whether the antenna port is deemed faulty or not by subjecting the at least one reference signal to an evaluation criterion. The method comprises transmitting, when the antenna port is deemed faulty, a report to the transmitting radio device. The report indicates that the antenna port is deemed faulty.

According to a second aspect there is presented a radio device acting as a receiving radio device for reporting a faulty antenna port at a transmitting radio device. The radio device comprises processing circuitry. The processing circuitry is configured to cause the radio device to receive at least one reference signal transmitted at an antenna port of the transmitting radio device. The processing circuitry is configured to cause the radio device to determine whether the antenna port is deemed faulty or not by subjecting the at least one reference signal to an evaluation criterion. The processing circuitry is configured to cause the radio device to transmit, when the antenna port is deemed faulty, a report to the transmitting radio device. The report indicates that the antenna port is deemed faulty.

According to a third aspect there is presented a radio device acting as a receiving radio device for reporting a faulty antenna port at a transmitting radio device. The radio device comprises processing circuitry and a storage medium. The storage medium stores instructions that, when executed by the processing circuitry, cause the radio device to perform operations, or steps. The operations, or steps, cause the radio device to receive at least one reference signal transmitted at an antenna port of the transmitting radio device. The operations, or steps, cause the radio device to determine whether the antenna port is deemed faulty or not by subjecting the at least one reference signal to an evaluation criterion. The operations, or steps, cause the radio device to transmit, when the antenna port is deemed faulty, a report to the transmitting radio device. The report indicates that the antenna port is deemed faulty.

According to a fourth aspect there is presented a radio device acting as a receiving radio device for reporting a faulty antenna port at a transmitting radio device. The radio device comprises a receive module configured to receive at least one reference signal transmitted at an antenna port of the transmitting radio device. The radio device comprises a determine module configured to determine whether the antenna port is deemed faulty or not by subjecting the at least one reference signal to an evaluation criterion. The radio device comprises a transmit module configured to transmit, when the antenna port is deemed faulty, a report to the transmitting radio device. The report indicates that the antenna port is deemed faulty.

According to a fifth aspect there is presented a computer program for reporting a faulty antenna port at a transmitting radio device, the computer program comprises computer program code which, when run on processing circuitry of a receiving radio device, causes the receiving radio device to perform a method according to the first aspect.

According to a sixth aspect there is presented a method for receiving reporting of a faulty antenna port at a transmitting radio device. The method is performed by the transmitting radio device. The method comprises transmitting at least one reference signal at an antenna port of the transmitting radio device. The method comprises receiving a report from a receiving radio device having received the at least one reference signal, wherein the report indicates that the antenna port is deemed faulty by the receiving radio device.

According to a seventh aspect there is presented a radio device acting as a transmitting radio device for receiving reporting of a faulty antenna port at the transmitting radio device. The radio device comprises processing circuitry. The processing circuitry is configured to cause the radio device to transmit at least one reference signal at an antenna port of the transmitting radio device. The processing circuitry is configured to cause the radio device to receive a report from a receiving radio device having received the at least one reference signal, wherein the report indicates that the antenna port is deemed faulty by the receiving radio device.

According to an eighth aspect there is presented a radio device acting as a transmitting radio device for receiving reporting of a faulty antenna port at the transmitting radio device. The radio device comprises processing circuitry and a storage medium. The storage medium stores instructions that, when executed by the processing circuitry, cause the radio device to perform operations, or steps. The operations, or steps, cause the radio device to transmit at least one reference signal at an antenna port of the transmitting radio device. The operations, or steps, cause the radio device to receive a report from a receiving radio device having received the at least one reference signal, wherein the report indicates that the antenna port is deemed faulty by the receiving radio device.

According to a ninth aspect there is presented a radio device acting as a transmitting radio device for receiving reporting of a faulty antenna port at the transmitting radio device. The radio device comprises a transmit module configured to transmit at least one reference signal at an antenna port of the transmitting radio device. The radio device comprises a receive module configured to receive a report from a receiving radio device having received the at least one reference signal, wherein the report indicates that the antenna port is deemed faulty by the receiving radio device.

According to a tenth aspect there is presented a computer program for receiving reporting of a faulty antenna port at a transmitting radio device, the computer program comprising computer program code which, when run on processing circuitry of the transmitting radio device, causes the transmitting radio device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio devices, and these computer programs provide efficient fault detection of the transmitting radio device Advantageously these methods, these radio devices, and these computer programs are suitable as fault handling mechanisms to be used for a transmitting radio device comprising an AAS.

Advantageously these methods, these radio devices, and these computer programs provide means for handling faulty antenna branches and thereby enabling deployments of well-performing, robust and cost-effective AAS with large antenna arrays suitable for 5G systems and/or for the evolution of Long Term Evolution (LTE) systems.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communications system according to embodiments;

FIGS. 2, 3, 4, and 5 are flowcharts of methods according to embodiments;

DETAILED DESCRIPTION

Figure 6:
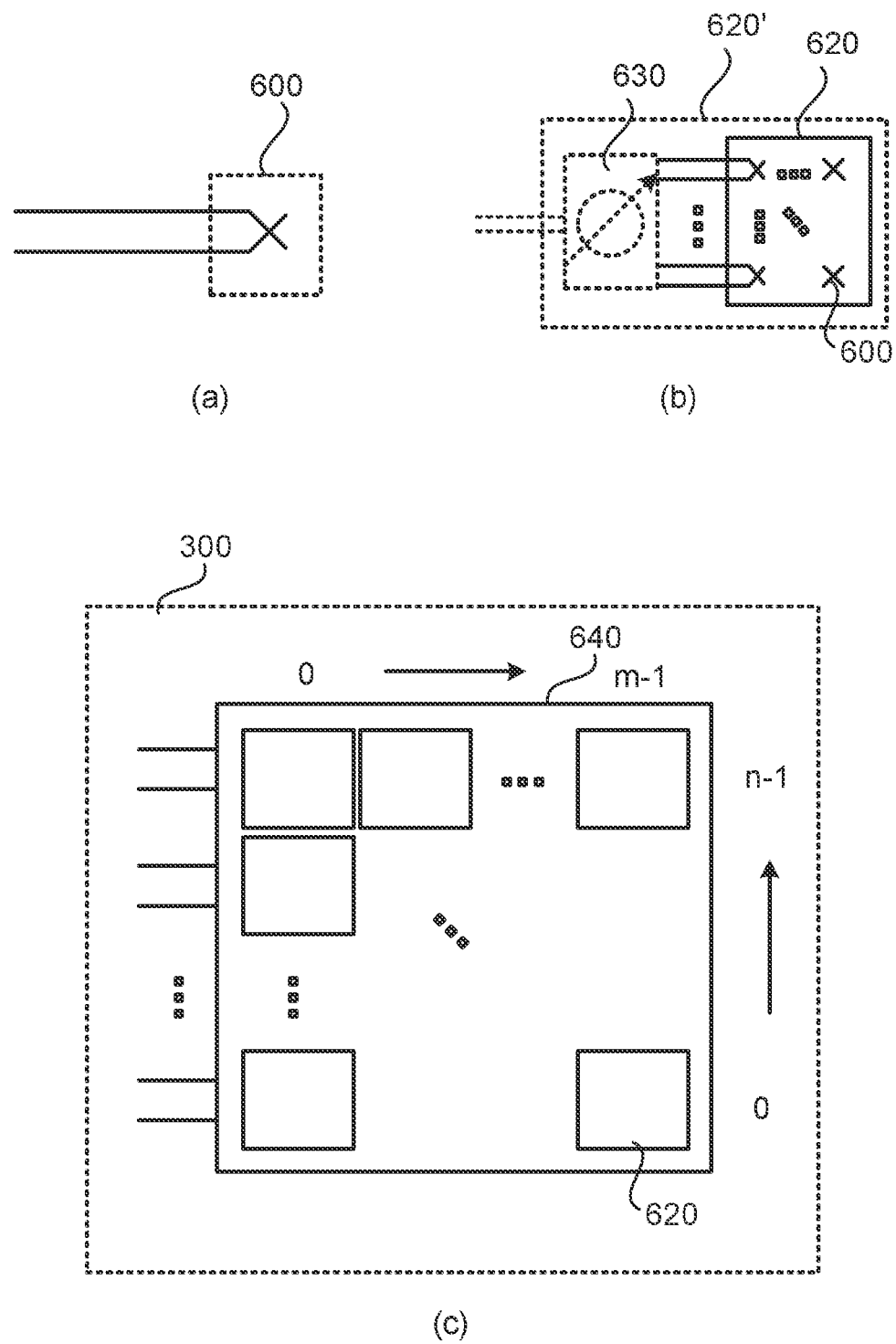
FIG. 6 is a schematic illustration of an Advanced Antenna System of a transmitting radio device according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications system 100 where embodiments presented herein can be applied.

The communications system 100 comprises at least one radio device 300 acting as a transmitting radio device 300. Further functionality of the transmitting radio device 300 and how it interacts with other entities, nodes, and devices in the communications system 100 will be further disclosed below. The transmitting radio device 300 could either be part of a radio access network 110 and be operatively connected to a core network 120 or be part of the core network 120.

The core network 120 is in turn operatively connected to a service network 130. The transmitting radio device 300 provides network access in the radio access network 110 by transmitting and receiving signals. A radio device 200 acting as a receiving radio device served by the transmitting radio device 300 is receiving signals from, and transmitting signals to, the transmitting radio device 300 enabled to access services and exchange data with the core network 120 and the service network 130.

For ease of notation, the radio device 200 will hereinafter be referred to as a receiving radio device 200 and the radio device 300 will hereinafter be referred to as a transmitting radio device 300. However, as the skilled person understands, the radio device 200 may selectively act as either a receiving radio device or a transmitting radio device, and the radio device 300 may selectively act as either a transmitting radio device or a receiving radio device.

Further, although the transmitting radio device 300 in FIG. 1 is illustrated as an access node and the receiving radio device 200 is illustrated as a terminal device, the transmitting radio device 300 could be implemented as a terminal device, and the receiving radio device 200 could be implemented as an access node. The herein disclosed embodiments are not limited to any particular implementation of the transmitting radio device 300 and the receiving radio device 200 in this respect.

The transmitting radio device 300 may comprise an AAS as disclosed above. In this respect, an AAS using dual polarized antenna elements as the basic building block is considered here for illustrative purposes. FIG. 6(a) schematically illustrates a single dual-polarized antenna element 600. Several of these dual polarized antenna elements could be combined into a subarray 620, 620' comprising, or at least being co-located with, a distribution network 630, where each subarray has two input signals, one per polarization dimension, as schematically illustrated in FIG. 6(b). The combination of the antenna elements into subarrays can be done in many ways. For example, an analogue distribution network can be used, with or without remote electrical tilt (RET) functionality, or a fully flexible analogue beamforming network, where the excitation of each element can be independently tuned, can be envisioned. How the combination into subarray is done will affect the antenna radiation pattern that an input signal to the subarray experiences. Multiple subarrays 620, 620' could be combined into an antenna array 640 to complete the AAS of the transmitting radio device 300, as schematically illustrated in FIG. 6(c) which comprises n-by-m subarrays 620, 620'.

The embodiments disclosed herein provide means for facilitating handling of faulty antenna ports at the transmitting radio device 300. In particular, detection and feedback of information related to potentially faulty antenna ports are considered. This includes introducing dedicated reporting from the receiving radio device 200 that comprises a fault detection indication. This report can then by the transmitting radio device 300 be used to, for example, adapt algorithms and therefore improve performance.

In general terms, an antenna port does not correspond to a physical antenna, but is rather a logical entity distinguished by having its own reference signal sequences. Hence, separate reference signals can be defined for each antenna port. The physical radio propagation channels seen from different antenna ports should preferably not interfere with each other. This could be accomplished by having different reference signal sequences with good cross-correlation properties, and by separating antenna ports in frequency, time or code (so-called cover-codes are used to make the antenna ports mutually orthogonal).

The embodiments disclosed herein thus relate to mechanisms for reporting a faulty antenna port at a transmitting radio device 300 and receiving reporting of a faulty antenna port at the transmitting radio device 300. In order to obtain such mechanisms there is provided a receiving radio device 200, a method performed by the receiving radio device 200, a computer program product comprising code, for example in the form of a computer program, that when run on processing circuitry of the receiving radio device 200, causes the receiving radio device 200 to perform the method. In order to obtain such mechanisms there is further provided a transmitting radio device 300, a method performed by the transmitting radio device 300, and a computer program product comprising code, for example in the form of a computer program, that when run on processing circuitry of the transmitting radio device 300, causes the transmitting radio device 300 to perform the method.

FIGS. 2 and 3 are flow charts illustrating embodiments of methods for reporting a faulty antenna port at a transmitting radio device 300 as performed by the receiving radio device 200. FIGS. 4 and 5 are flow charts illustrating embodiments of methods for receiving reporting of a faulty antenna port at the transmitting radio device 300 as performed by the transmitting radio device 300. The methods are advantageously provided as computer programs 1420a, 1420b.

Reference is now made to FIG. 2 illustrating a method for reporting a faulty antenna port at a transmitting radio device 300 as performed by the receiving radio device 200 according to an embodiment.

As will be disclosed below, the transmitting radio device 300 transmits at least one reference signal at an antenna port. This at least one reference signal is assumed to be received by the receiving radio device 200. Hence, the receiving radio device 200 is configured to perform step S104:

S104: The receiving radio device 200 receives at least one reference signal transmitted at an antenna port of the transmitting radio device 300.

Once having received the at least one reference signal, the receiving radio device 200 determines whether the antenna port is faulty or not by analyzing the at least one reference signal. Hence, the receiving radio device 200 is configured to perform step S106:

S106: The receiving radio device 200 determines whether the antenna port is deemed faulty or not by subjecting the at least one reference signal to an evaluation criterion.

A report is then transmitted by the receiving radio device 200 when the antenna port is deemed faulty. Hence, the receiving radio device 200 is configured to perform step S108:

S108: The receiving radio device 200 transmits, when the antenna port is deemed faulty, a report to the transmitting radio device 300. The report indicates that the antenna port is deemed faulty.

No report is sent when the antenna port is deemed not faulty.

Advantageously, a single short fault message, as defined by the report, is transmitted when a potential fault is detected by the receiving radio device 200, compared to, for example, if the receiving radio device 200 would regularly measure and report the power (or use another evaluation criterion) of each antenna port.

In general terms the at least one reference signal should be interpreted as a reference signal sequence associated with the antenna port. The receiving radio device 200 could be configured to receive such reference sequences associated with at least one antenna port, i.e. each antenna port has its own reference signal sequence. As will be further disclosed below, the receiving radio device 200 could be configured to process several antenna ports (i.e., several reference signal sequences) in parallel.

Embodiments relating to further details of reporting a faulty antenna port at a transmitting radio device 300 as performed by the receiving radio device 200 will now be disclosed.

There could be different evaluation criteria that the receiving radio device 200 uses in step S106 in order to determines whether the antenna port is deemed faulty or not. As an example, the evaluation criteria could consider the signal to noise ratio (SNR) or the signal to interference plus noise ratio (SINR). Reference Signal Received Power (RSRP) or other measurements could be used, as is or modified, or a new procedure/measurement can be defined and used for this purpose. Further embodiments relating thereto will now be disclosed.

According to an embodiment the evaluation criterion relates to received power, and subjecting the at least one reference signal to the evaluation criterion comprises comparing received power of the at least one reference signal to a power threshold.

According to an embodiment the evaluation criterion relates to signal quality, and subjecting the at least one reference signal to the evaluation criterion comprises comparing signal quality of the at least one reference signal to a quality threshold.

Typically there is only one reference signal sequence associated with an antenna port, and the reference signal sequences associated with different antenna ports have good cross-correlation properties. According to an embodiment the quality threshold therefore is a function of an average of the received power of all reference signals associated with the antenna ports, such as all the antenna ports or a subset of all antenna ports (e.g., antenna ports that are Quasi Co-Located (QCL) antenna ports). Hence several antenna ports could be jointly processed, such that the average received power from the reference signals is associated with the subset of antenna ports that have the same relevant QCL statistics.

According to an embodiment the evaluation criterion relates to signal phase, and wherein subjecting the at least one reference signal to the evaluation criterion comprises comparing signal phase of the at least one reference signal to a phase threshold.

Any of the above disclosed thresholds could be either absolute, or relative; e.g. based on power, signal quality, or signal phase, of other received signals. For example, the power threshold could be a function of average received power of all reference signals associated with antenna ports that are QCL antenna ports. In this respect, the notion of QCL can be generalized to include any explicit differences between antenna ports. For example, it is envisioned that different (groups of) antenna ports use different transmission power. This information is then included in the QCL information and used when normalizing the per antenna port quality. For example, an antenna port can be deemed faulty if the associated measured received power of the reference signal is below a specific threshold (absolute), or if the received power is below the average power measured over all QCL antenna ports times a threshold (relative).

In some aspects the receiving radio device 200 measures the received power, or other signal quantity such as signal quality or signal phase of the at least one reference signal for each antenna port over a specific time period t1, where t1 typically is long enough to remove small scale effects, e.g. average out fast fading, and achieve enough accuracy. Hence, according to an embodiment the received power is measured over a time period to gather statistics of the received power, and the received power is compared to the power threshold based on the statistics.

In some aspects a timer T is started and the receiving radio device 200 performs measurements until n faults have been found for a specific antenna port, where a fault is triggered if, for example, the measured power over a port falls below a power threshold (or similar if another evaluation criterion is used). Between each assessment a predefined time t2 should elapse. If the timer T expires, then the receiving radio device 200 restarts the procedure, i.e. reset the number of faults. The receiving radio device 200 could be configured to then make an assessment based on the total elapsed time to find n faults.

Alternatively the receiving radio device 200 could be configured to, for each antenna port, perform n consecutive measurements with a predefined time-period between each assessment and count the number of assessments m where the received power is below the power threshold (or similar if another evaluation criterion is used). Alternatively phrased, the receiving radio device 200 could be configured to perform repeated measurements over a specified time period t3, where each measurement is over a time period t1 and the time between each measurement is t2, and count the number of occasions where the received power is below the threshold α.

Timers/thresholds can also be defined implicitly, e.g. rather than specifying a timer T that determines the length of each measurement, the timer T can be specified as a performance requirement. For example, the measurement should be done such that the accuracy of the result is plus/minus x dB. Timers, counters, rules, thresholds, etc., can be antenna specific, i.e. they are likely to, but not limited to, be cell-specific.

Figure 8:
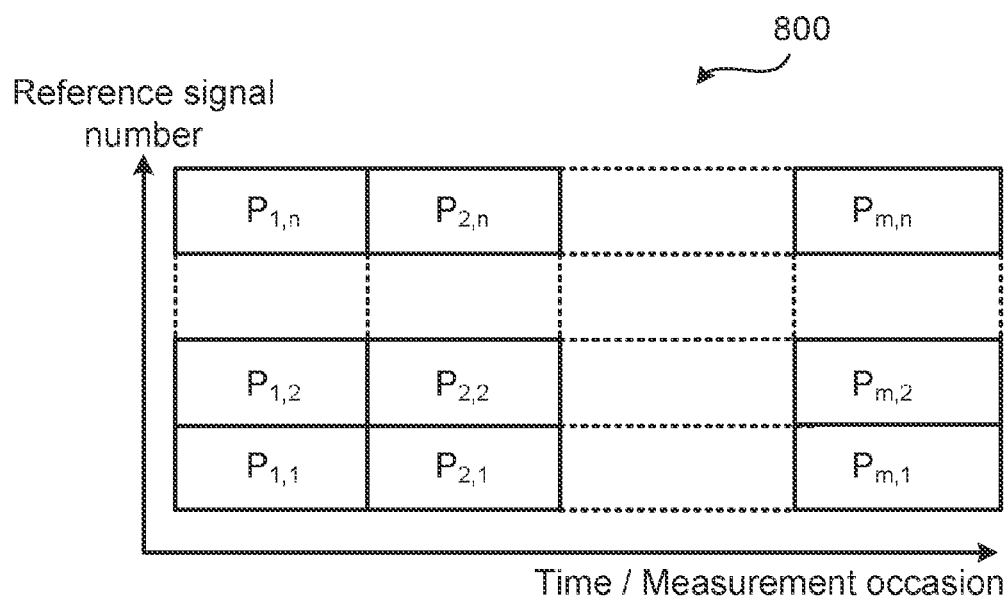
FIG. 8 is a schematic illustration of a bit-map layout for logging power measurements according to an embodiment.

Instead of counting the number of potential faults, each fault-occasion can be marked in a bit-map having time as one dimension, and potentially port number (CSI-RS) as another. Also, instead of counting the number of potential faults, the measured power for each reference signal can be logged. Based on the error pattern, a judgment of the type of fault can be made. FIG. 8 schematically illustrates a bit-map layout 800 for logging power measurements where a received power value Px,y is logged for reference signal number x at time/measurement occasion y.

Timers and counters, e.g. t1, t2, t3 above, could, for example, be agnostic with reference to a standard (i.e., standard transparent), hardwired, defined by a standard, signaled by the network, deduced based on other inputs, such as Doppler, or a combination thereof. Similarly, any of the above thresholds, such as exemplified by α above, could, for example, be set by a standard, signaled by the transmitting radio device 300, deduced based on other inputs, such as total received power, average received power over all antenna ports, total transmitted power, transmitted power per antenna branch, transmitted power per antenna port, or a combination thereof.

Reference is now made to FIG. 3 illustrating methods for reporting a faulty antenna port at a transmitting radio device 300 as performed by the receiving radio device 200 according to further embodiments. It is assumed that steps S104, S106, S108 are performed as described above with reference to FIG. 2 and a thus repeated description thereof is therefore omitted.

The assessment whether an antenna port is deemed faulty or not could be performed periodically, or be event triggered. In some aspects the receiving radio device 200 is configured by the transmitting radio device 300 for reporting when an antenna port is deemed faulty. Hence, according to an embodiment the receiving radio device 200 is configured to perform step S102:

S102: The receiving radio device 200 obtains a request from the transmitting radio device 300 to determine whether the antenna port is deemed faulty or not.

As mentioned above, the threshold could be based on using relative measurements as inputs. The receiving radio device 200 may therefore need to use signals received also from other antenna ports during the evaluation of a given antenna port. Hence, according to an embodiment the receiving radio device 200 is configured to perform step S104a:

S104a: The receiving radio device 200 receives at least one further signal transmitted at at least one further antenna port of the transmitting radio device 300. The at least one further signal is used when determining whether the antenna port is deemed faulty or not in step S106.

Reception of the report transmitted in step S108 is in some aspects acknowledged by the transmitting radio device 300. That is, the transmitting radio device 300 could be configured to inform the receiving radio device 200 that it has received the report. Hence, according to an embodiment the receiving radio device 200 is configured to perform step S110:

S110: The receiving radio device 200 receives an acknowledgement of the report from the transmitting radio device 300.

Further aspects of the acknowledgement will be disclosed below in conjunction with the disclosure of step S210.

In some aspects the receiving radio device 200 does not trigger transmission of the same report again. Hence, according to an embodiment the receiving radio device 200 is configured to perform step S112 when the antenna port is deemed faulty:

S112: The receiving radio device 200 refrains from transmitting more than one report to the transmitting radio device 300 indicating that the antenna port is deemed faulty.

The receiving radio device 200 could thereby be configured to avoid assessing, and potentially reporting, the same fault over and over again. For example, if a fault report has been received and acknowledged (if applicable) by the transmitting radio device 300 as in step S110, then the receiving radio device 200 might not trigger the same report again until explicitly told to re-start evaluating the previously faulty antenna port, until a timer has expired or until a rule enabling re-start of fault detection is triggered. An example of a rule could be a cell restart.

In some aspects the receiving radio device 200 does not take into account measurements of a faulty antenna port during future reporting of reference signals received from the transmitting radio device 300. Therefore, according to an embodiment the receiving radio device 200 is configured to perform step S114 when the antenna port is deemed faulty:

S114: The receiving radio device 200 ignores reception of further signals from the antenna port deemed faulty.

Step S114 facilitates so-called antenna port subset restriction and would help the receiving radio device 200 in terms of, for example, avoiding assessing faulty antenna ports once again (see above), and avoiding the need to perform channel estimation for zero power reference signals, thereby reducing processing burden and enhancing estimation of rank (RI), precoding matrix index (PMI), channel state information (CSI) resource selection (CRI) and channel quality indicator (CQI) information.

Step S114 could be autonomously triggered in the receiving radio device 200 if an antenna port is deemed faulty, or it can be triggered by the transmitting radio device 300, either implicitly via acknowledgment of the report in step S110 or via an explicit antenna port subset restriction network signal. That is, according to an embodiment the ignoring in step S114 is triggered either by the receiving radio device 200 or by the transmitting radio device 300.

In some aspects, measurement for each antenna port is made several times for the receiving radio device 200 to gain more knowledge, and, for example, to enable the transmitting radio device 300 to identify partly faulty antenna ports, such as faults caused by loose connections. Therefore, according to an embodiment the at least one reference signal is represented by a set of time/frequency resources, and the at least one reference signal is repeatedly subjected to the evaluation criterion for at least two occurrences of such sets of time/frequency resources.

Figure 7:
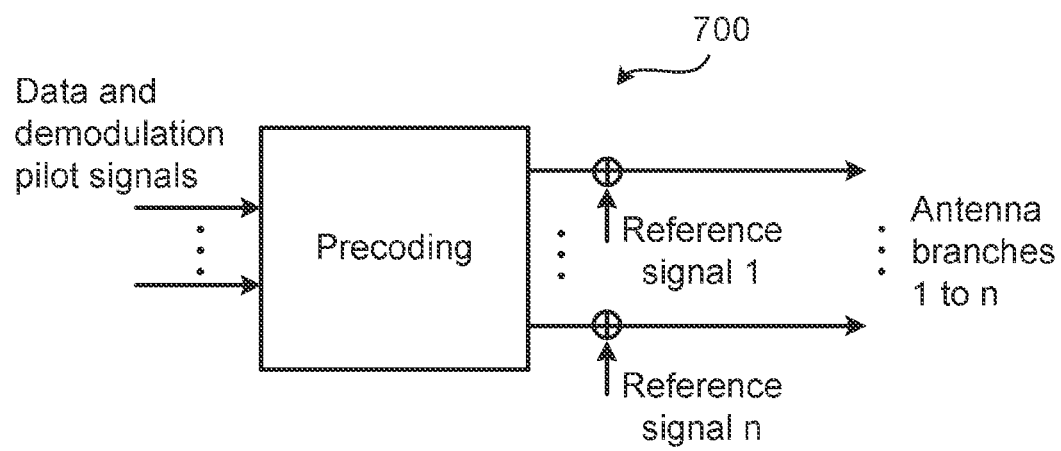
FIG. 7 is a schematic illustration of mapping between reference signals and antenna branches according to embodiments.

In some aspects there are as many reference signals as there are antenna ports. FIG. 7 schematically illustrates how data and demodulation pilot signals are input to a precoder and where n reference signals 1 . . . n are mapped to n antenna branches 1 . . . n. The receiving radio device 200 could then perform the evaluation (as defined by steps S104, S106, S108) for each antenna port. Hence, according to an embodiment the transmitting radio device 300 transmits the at least one reference signal on a plurality of antenna ports one at a time, and the determining in step S106 is repeated for all antenna ports, and the report indicates all those antenna port that are deemed faulty.

Measurements and/or fault assessments can be made for all antenna ports in parallel, or in a time-multiplexed manner, i.e. one antenna port in each time period, or a combination thereof, e.g. spread the measurements over time, where for each time instance, a number of parallel antenna ports are evaluated. The approach of spreading the measurements in time reduces the instantaneous processing requirement at the receiving radio device 200, and reduces the required number of antenna ports. As an example, a single antenna port can be used to assess all antenna branches at the transmitting radio device 300 by the transmitting radio device 300 transmitting the at least one reference signal from different antenna branches each time period. The receiving radio device 200 will then transmit a report as in step S108 for each antenna port deemed faulty (without knowing which antenna branch the measurement corresponds to), and the transmitting radio device 300 needs to map each reported measurement to the correct antenna branch.

Next follows an illustrative example. Assume for illustrative and non-limiting purposes that the receiving radio device 200 is configured to assess the quality of n antenna ports, split into m groups or panels with n/m antenna ports each, where antenna ports belonging to a group have the same relevant QCL characteristics in terms of path loss and transmit power. For example, the antenna might consist of m panels that are spatially distributed, hence having different average path loss characteristics. The receiving radio device 200 measures the long-term average receive power for each antenna port e.g. using the reference signals associated with each antenna port. Furthermore, the receiving radio device 200 determines the average received power for each group of antenna ports. Then, if the average received power of an antenna port normalized with the average received power of all antenna ports in the associated QCL group is below a threshold, then the antenna port is deemed faulty, and a report is triggered and transmitted to the transmitting radio device 300.

Reference is now made to FIG. 4 illustrating a method for receiving reporting of a faulty antenna port at the transmitting radio device 300 as performed by the transmitting radio device 300 according to an embodiment.

As disclosed above, the receiving radio device 200 is configured to determine whether an antenna port at the transmitting radio device 300 is faulty by analysing at least one reference signal transmitted by the transmitting radio device 300. Hence the transmitting radio device 300 is configured to perform step S204:

S204: The transmitting radio device 300 transmits at least one reference signal at an antenna port of the transmitting radio device 300.

As disclosed above, the receiving radio device 200 transmits a report if the receiving radio device 200 deems the antenna port to be faulty. Hence the transmitting radio device 300 is configured to perform step S206:

S206: The transmitting radio device 300 receives a report from the receiving radio device 200 having received the at least one reference signal. The report indicates that the antenna port is deemed faulty by the receiving radio device 200.

Embodiments relating to further details of receiving reporting of a faulty antenna port at the transmitting radio device 300 as performed by the transmitting radio device 300 will now be disclosed.

Reference is now made to FIG. 5 illustrating methods for receiving reporting of a faulty antenna port at the transmitting radio device 300 as performed by the transmitting radio device 300 according to further embodiments. It is assumed that steps S204, S206 are performed as described above with reference to FIG. 4 and a thus repeated description thereof is therefore omitted.

As disclosed above, the transmitting radio device 300 could be configured to configure the receiving radio device 200 for reporting if an antenna port is deemed faulty. Hence, according to an embodiment the transmitting radio device 300 is configured to perform step S202:

S202: The transmitting radio device 300 provides a request to the receiving radio device 200 to determine whether the antenna port is deemed faulty or not.

A single antenna port can be used to assess all antenna branches at the transmitting radio device 300 by having the transmitting radio device 300 transmitting the reference signal of the single antenna port using different antenna branches each time period. Hence, according to an embodiment the transmitting radio device 300 is configured to perform step S202 when there are at least two antenna branches:

S204a: The transmitting radio device 300 sequentially maps the antenna port to each of the at least two antenna branches, such that the at least one reference signal is transmitted at the antenna port using all of the at least two antenna branches one at a time.

That is, at a first time instant the antenna port is mapped to a first antenna branch, and at the next time the antenna port is mapped to the second branch, and so on.

As disclosed above, an antenna port is regarded as a logical entity, but it is mapped to physical resources, such as antenna branches, radio chains, or other hardware components at the transmitting radio device 300. Hence, according to an embodiment the antenna port is mapped to at least one antenna branch at the transmitting radio device 300.

In some aspects the transmitting radio device 300 runs internal diagnostics in order to evaluate whether or not the report is correct. Hence, even though the receiving radio device 200 evaluates whether an antenna branch is faulty and reports this to the transmitting radio device 300, the transmitting radio device 300 could be configured to make the final decision whether the antenna port in fact is faulty. Hence, according to an embodiment the transmitting radio device 300 is configured to perform step S208:

S208: The transmitting radio device 300 runs a fault diagnostics procedure on the at least one antenna branch in order to verify whether the report is correct or not.

The transmitting radio device 300 could then inform the receiving radio device 200 of its decision in an acknowledgment to the receiving radio device 200.

As disclosed above, reception of the report transmitted by the receiving radio device 200 in step S110 could thus be acknowledged by the transmitting radio device 300, i.e. the transmitting radio device 300 could be configured to inform the receiving radio device 200 that it has received the report. Hence, according to an embodiment the transmitting radio device 300 is configured to perform step S210:

S210: The transmitting radio device 300 transmits an acknowledgement of the report to the receiving radio device 200.

The acknowledgement could comprise different levels of information. For example, the acknowledgement could inform the receiving radio device 200 that all information has been received and acknowledged (binary ACK), or it could inform the receiving radio device 200 that the report is considered incorrect and should not be taken into consideration. As another example, the acknowledgement could comprise more information informing the receiving radio device 200 that part of the report has been acknowledged and corresponding actions should apply, whereas other parts of the report are seen as incorrect and should not be used to adapt the system behaviour. The acknowledgement transmitted from the transmitting radio device 300 in step S210 could thus inform the receiving radio device 200 what action to take. Hence, according to an embodiment the acknowledgement in steps S110 and S210 specifies an action relating to the reported antenna port deemed faulty. The action is to be taken by the receiving radio device 200.

The acknowledgement transmitted from the transmitting radio device 300 in step S210 could inform the receiving radio device 200 that the report transmitted by the receiving radio device 200 in step S108 is considered incorrect and that the receiving radio device 200 is to continue reception, or that the receiving radio device 200 is to stop reception (when report is correct). Hence, according to an embodiment the action indicates that the receiving radio device 200 is to continue reception of signals transmitted at the antenna port due to the antenna port erroneously having been deemed faulty by the receiving radio device 200, According to an alternative embodiment the action indicates that the receiving radio device 200 is to ignore reception of signals transmitted at the antenna port.

As disclosed above, in some aspects there are as many reference signals as there are antenna ports and in order for the receiving radio device 200 to perform the evaluation for each antenna port, a reference signal needs to be transmitted on a plurality of antenna ports, one at a time if the receiving radio device 200 is not enabled to process several antenna ports in parallel. Further, according to an embodiment the at least one reference signal is transmitted on a plurality of antenna ports, one at a time. In this respect, as disclosed above, a reference signal having its own unique reference signal sequence could be mapped to each respective antenna port such that a unique reference signal sequence is transmitted from each antenna port. That is, each antenna port could have its own reference signal sequence. Transmission of reference signals on different antenna ports could be separated in time, frequency or by cover codes.

As disclosed above, the transmitting radio device 300 could run internal diagnostic tests. If the internal diagnostic test reveals that the antenna port indeed is faulty, the transmitting radio device 300 could then adapt its operation thereafter. For example, the transmitting radio device 300 could re-map the antenna port to another antenna branch (assuming that there are two or more antenna branches in the transmitting radio device 300 could). Hence, according to an embodiment the transmitting radio device 300 is configured to perform step S212 when there are at least two antenna branches:

S212: The transmitting radio device 300 re-maps the antenna port from its current antenna branch of the at least two antenna branches to another one of the at least two antenna branches, such that the at least one reference signal is transmitted at the antenna port using said another one of the at least two antenna branches.

In more detail, if fewer antenna ports than there are antenna branches are to be used, then only a subset of all antenna branches in each evaluation period can be evaluated. A re-mapping of antenna branches and antenna ports is then performed between different evaluation periods. One example would be to assign one (or a few) special antenna port(s) used for fault detection, where both the transmitting radio device 300 and the receiving radio device 200 know the time instances when a re-mapping between antenna branch and antenna port occurs. In this case the receiving radio device 200 would need to make the evaluation of each antenna branch in a time-sequential manner, one at a time.

Figure 9:
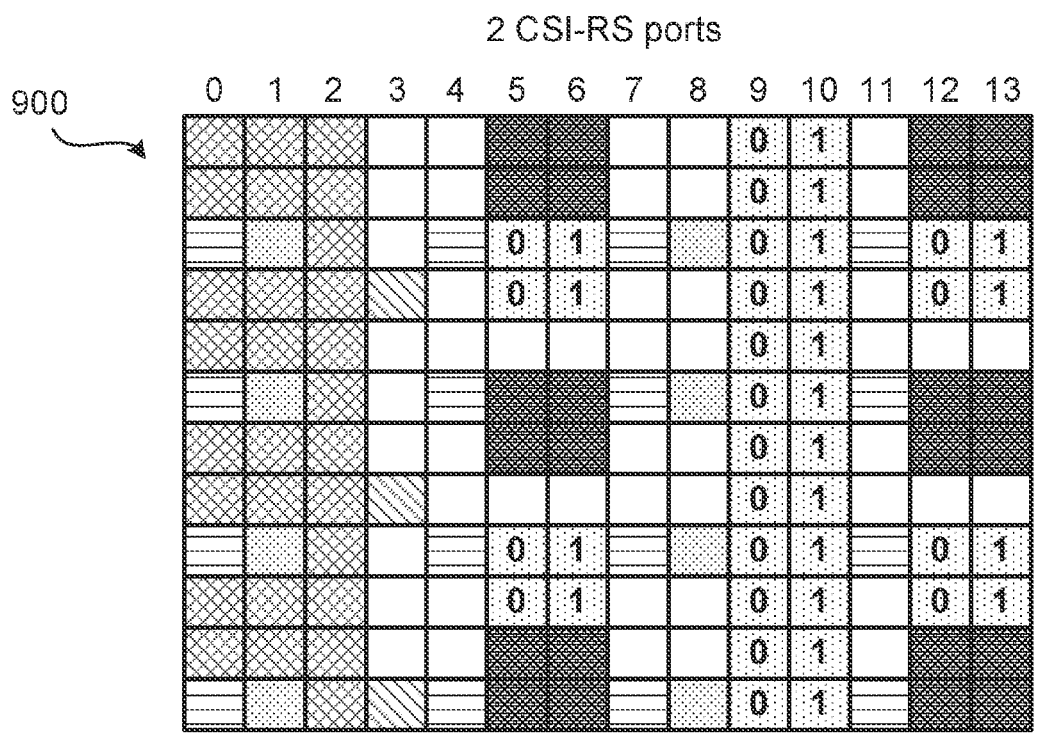
FIG. 9 is a schematic illustration of resource element grids according to embodiments.
Figure 9:
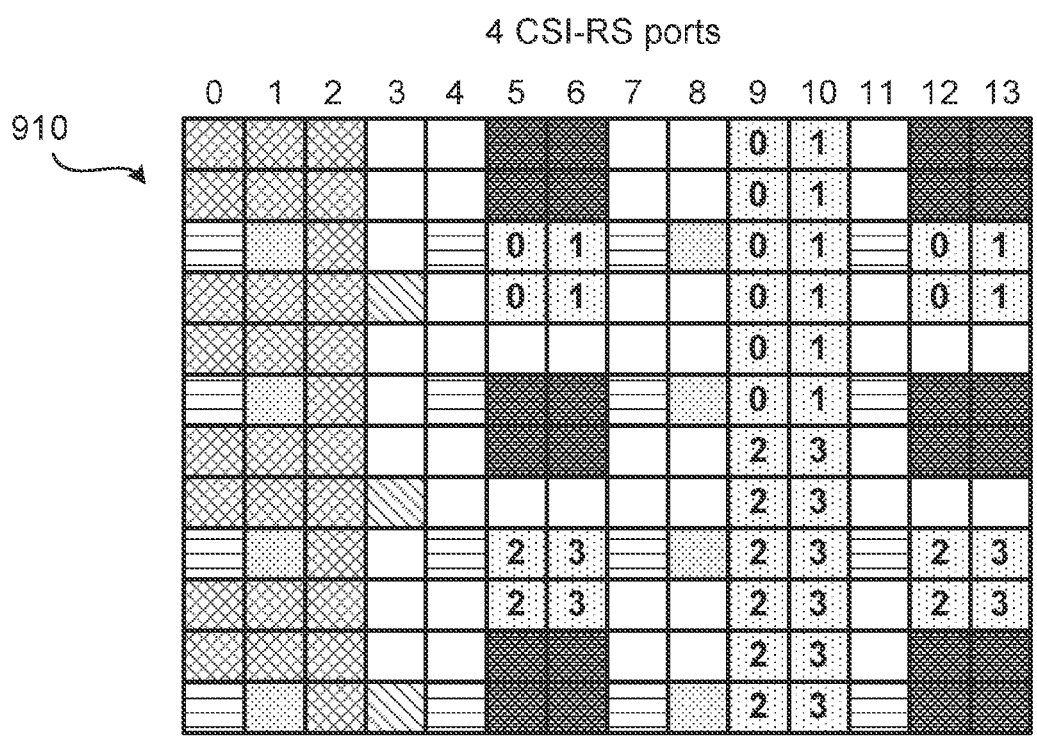
Figure 9:
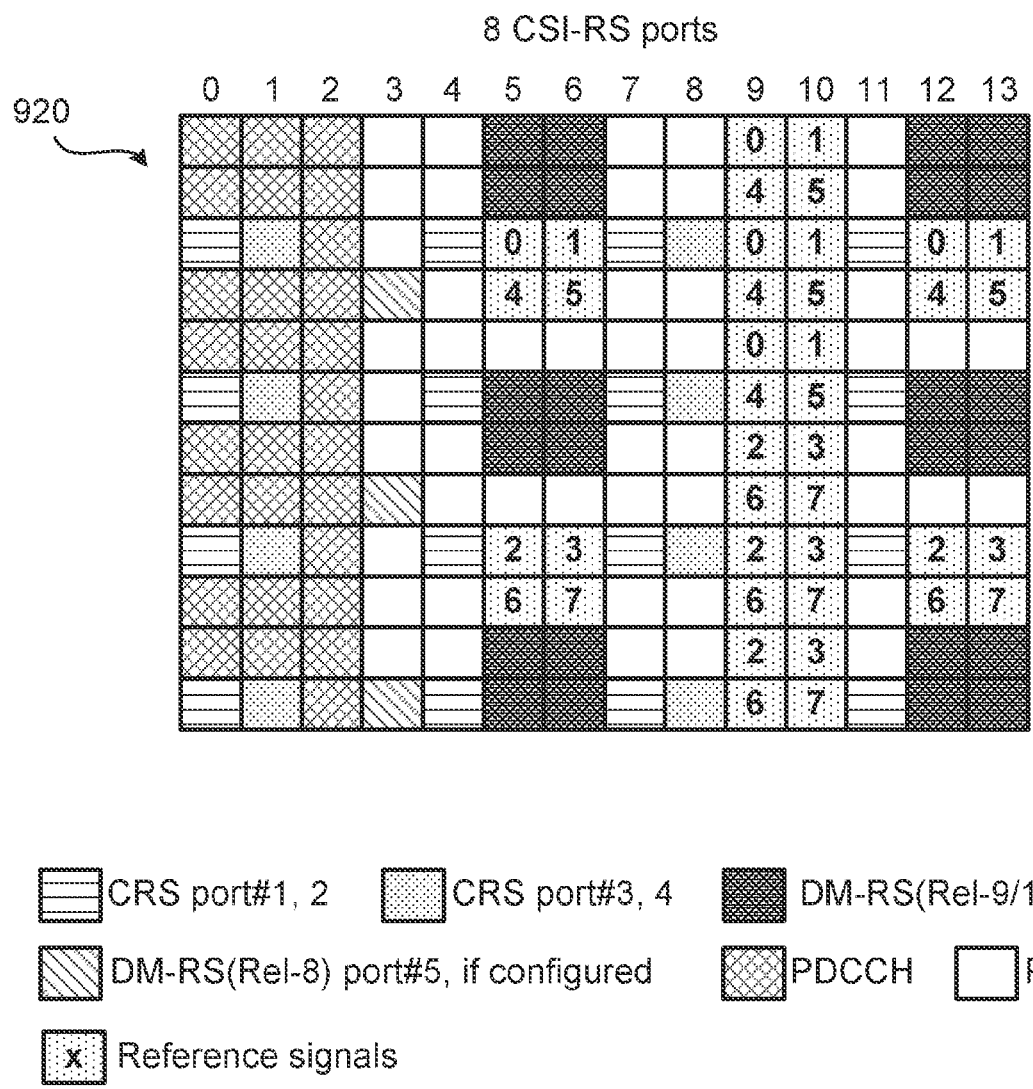

There may be different examples of reference signals. Examples include, but are not limited to Channel-State Information Reference Signals (CSI-RS), Demodulation Reference Signals (DM-RS), Sounding Reference Signals (SRS). FIG. 9 at 900, 910 and 920 illustrates three examples of a resource element grid over an resource block pair showing potential positions for Release 9 or 10 user-specific reference signals (DM-RS), CSI-RS (marked with a number x corresponding to the CSI-RS antenna port, i.e., where x takes a value in the sets {0,1}, {0,1,2,3} and {0,1,2,3,4,5,6,7}, respectively), and cell-specific reference signals (CRS), together with resource elements used for physical downlink control channel (PDCCH) and physical downlink shared channel (PDSCH). The CSI-RS utilizes an orthogonal cover code of length two to overlay two antenna ports on two consecutive resource elements. As seen, many different CSI-RS patterns are available. For the case of 2 CSI-RS antenna ports, there are 20 different patterns within a subframe. The corresponding number of patterns is 10 and 5 for 4 and 8 CSI-RS antenna ports, respectively. For time division duplex (TDD) additional CSI-RS patterns are available.

Figure 10:
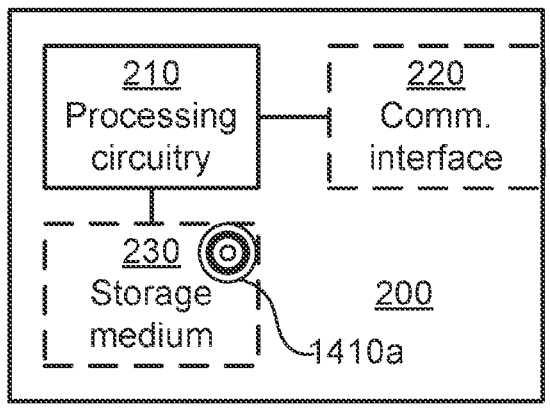
FIG. 10 is a schematic diagram showing functional units of a receiving radio device according to an embodiment.

FIG. 10 schematically illustrates, in terms of a number of functional units, the components of a radio device 200 acting as a receiving radio device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the receiving radio device 200 to perform a set of operations, or steps, S102-S114, as disclosed above. For example, the storage medium 230 may store the set of operations, and the processing circuitry 210 may be configured to retrieve the set of operations from the storage medium 230 to cause the receiving radio device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The receiving radio device 200 may further comprise a communications interface 220 for communications at least with a transmitting radio device 300. As such the communications interface 220 may comprise one or more transmitters and receivers, comprising analogue and digital components.

The processing circuitry 210 controls the general operation of the receiving radio device 200 e.g. by sending data and control signals to the communications interface 220 and the storage medium 230, by receiving data and reports from the communications interface 220, and by retrieving data and instructions from the storage medium 230. Other components, as well as the related functionality, of the receiving radio device 200 are omitted in order not to obscure the concepts presented herein.

Figure 11:
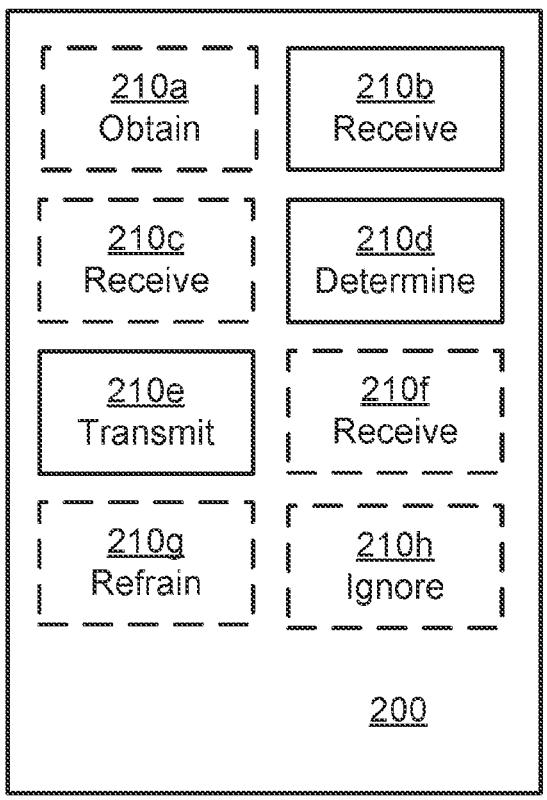
FIG. 11 is a schematic diagram showing functional modules of a receiving radio device according to an embodiment.

FIG. 11 schematically illustrates, in terms of a number of functional modules, the components of a radio device 200 acting as a receiving radio device 200 according to an embodiment. The receiving radio device 200 of FIG. 11 comprises a number of functional modules; a receive module 210b configured to perform step S104, a determine module 210d configured to perform step S106, and a transmit module 210e configured to perform step S108. The receiving radio device 200 of FIG. 11 may further comprise a number of optional functional modules, such as any of an obtain module 210a configured to perform step S102, a receive module 210c configured to perform step S104a, a receive module 210f configured to perform step S110, a refrain module 210g configured to perform step S112, and an ignore module 210h configured to perform step S114. In general terms, each functional module 210a-210h may be implemented in hardware or in software. Preferably, one or more or all functional modules 210a-210h may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210h and to execute these instructions, thereby performing any steps of the receiving radio device 200 as disclosed herein.

Figure 12:
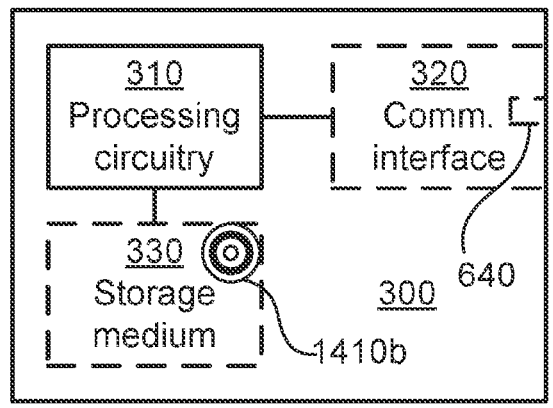
FIG. 12 is a schematic diagram showing functional units of a transmitting radio device according to an embodiment.

FIG. 12 schematically illustrates, in terms of a number of functional units, the components of a radio device 300 acting as a transmitting radio device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the transmitting radio device 300 to perform a set of operations, or steps, S202-S212, as disclosed above. For example, the storage medium 330 may store the set of operations, and the processing circuitry 310 may be configured to retrieve the set of operations from the storage medium 330 to cause the transmitting radio device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The transmitting radio device 300 may further comprise a communications interface 320 for communications at least with a receiving radio device 200. As such the communications interface 320 may comprise one or more transmitters and receivers, comprising analogue and digital components.

The processing circuitry 310 controls the general operation of the transmitting radio device 300 e.g. by sending data and control signals to the communications interface 320 and the storage medium 330, by receiving data and reports from the communications interface 320, and by retrieving data and instructions from the storage medium 330. Other components, as well as the related functionality, of the transmitting radio device 300 are omitted in order not to obscure the concepts presented herein.

Figure 13:
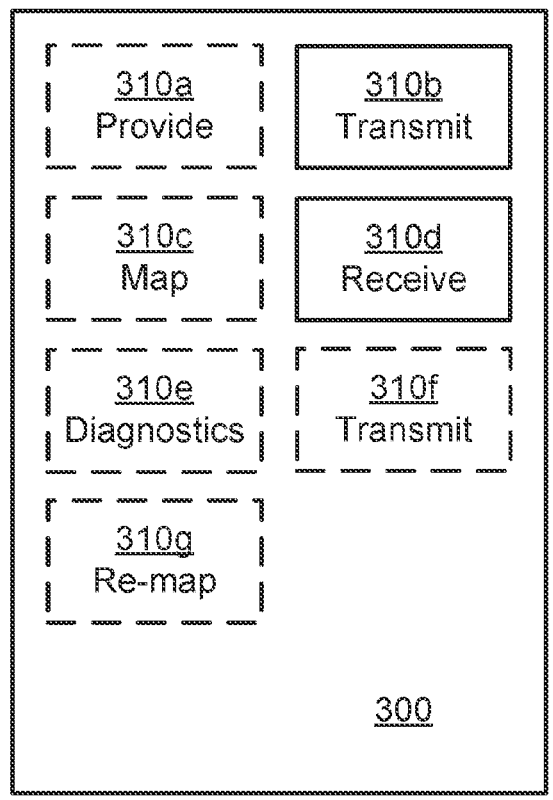
FIG. 13 is a schematic diagram showing functional modules of a transmitting radio device according to an embodiment.

FIG. 13 schematically illustrates, in terms of a number of functional modules, the components of a radio device 300 acting as a transmitting radio device 300 according to an embodiment. The transmitting radio device 300 of FIG. 13 comprises a number of functional modules; a transmit module 310b configured to perform step S204, and a receive module 310d configured to perform step S206. The transmitting radio device 300 of FIG. 13 may further comprise a number of optional functional modules, such as any of a provide module 310a configured to perform step S202, a map module 310c configured to perform step S204a, a diagnostics module 310e configured to perform step S208, a transmit module 310f configured to perform step S210, and a re-map module 310g configured to perform step S212. In general terms, each functional module 310a-310g may be implemented in hardware or in software. Preferably, one or more or all functional modules 310a-310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310g and to execute these instructions, thereby performing any steps of the transmitting radio device 300 as disclosed herein.

The receiving radio device 200 and/or the transmitting radio device 300 may be provided as a standalone device or as a part of at least one further device. For example, one of the receiving radio device 200 and the transmitting radio device 300 may be provided in a node of the radio access network or in a node of the core network. Alternatively, functionality of the receiving radio device 200 and/or transmitting radio device 300 may be distributed between at least two devices, or nodes. These at least two nodes, or devices, may either be part of the same network part (such as the radio access network or the core network) or may be spread between at least two such network parts.

Thus, a first portion of the instructions performed by the receiving radio device 200/transmitting radio device 300 may be executed in respective first devices, and a second portion of the of the instructions performed by the receiving radio device 200/transmitting radio device 300 may be executed in respective second devices; the herein disclosed embodiments are not limited to any particular number of devices on which the instructions performed by the receiving radio device 200 and/or the transmitting radio device 300 may be executed. Hence, the methods according to the herein disclosed embodiments are suitable to be performed by a receiving radio device 200 and/or a transmitting radio device 300 residing in a cloud computational environment. Therefore, although a single processing circuitry 210, 310 is illustrated in FIGS. 10 and 12 the processing circuitry 210, 310 may be distributed among a plurality of devices, or nodes. The same applies to the functional modules 210a-210h, 310a-310g of FIGS. 11 and 13 and the computer programs 1420a, 1420b of FIG. 14 (see below).

Figure 14:
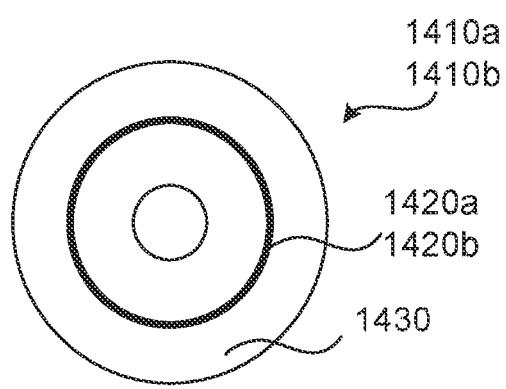
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420a can be stored, which computer program 1420a can cause the processing circuitry 210 and thereto operatively coupled entities and devices, such as the communications interface 220 and the storage medium 230, to execute methods according to embodiments described herein. The computer program 1420a and/or computer program product 1410a may thus provide means for performing any steps of the receiving radio device 200 as herein disclosed. On this computer readable means 1430, a computer program 1420b can be stored, which computer program 1420b can cause the processing circuitry 310 and thereto operatively coupled entities and devices, such as the communications interface 320 and the storage medium 330, to execute methods according to embodiments described herein. The computer program 1420b and/or computer program product 1410b may thus provide means for performing any steps of the transmitting radio device 300 as herein disclosed.

In the example of FIG. 14, the computer program product 1410a, 1410b is illustrated as an optical disc, such as a CD (compact disc) or a DVD (digital versatile disc) or a Blu-Ray disc. The computer program product 1410a, 1410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420a, 1420b is here schematically shown as a track on the depicted optical disk, the computer program 1420a, 1420b can be stored in any way which is suitable for the computer program product 1410a, 1410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

In the herein disclosed embodiments the term faulty antenna port is commonly used. It is understood by the person skilled in the art that equivalents of this term are equally applicable and hence the herein disclosed embodiments are equally applicable to determine whether any of a radio chain, radio hardware, antenna subarray, antenna element, virtualized antenna element, etc., is deemed faulty.

Furthermore, the term faulty can be interpreted widely, such as referring to an antenna port being completely broken, partly broken (e.g. when a reference signals is received with reduced power), having a loose connection, etc.

Furthermore, although at least some embodiments refer to the LTE terminology, the herein disclosed embodiments are equally applicable to 5th generation (New Radio) telecommunications systems, or the like.

The invention claimed is:

1. A method for reporting a faulty antenna port at a transmitting radio device, the method comprising a receiving radio device:
  receiving at least one reference signal transmitted at an antenna port of the transmitting radio device;
  determining whether the antenna port is deemed faulty or not by subjecting the at least one reference signal to an evaluation criterion; and
  when the antenna port is deemed faulty reporting that the antenna port is deemed faulty.

2. The method of claim 1:
  wherein the evaluation criterion relates to received power; and
  wherein subjecting the at least one reference signal to the evaluation criterion comprises comparing received power of the at least one reference signal to a power threshold.

3. The method of claim 2:
  wherein the received power is measured over a time period to gather statistics of the received power; and
  wherein the received power is compared to the power threshold based on the statistics.

4. The method of claim 1:
  wherein the evaluation criterion relates to signal quality; and
  wherein subjecting the at least one reference signal to the evaluation criterion comprises comparing signal quality of the at least one reference signal to a quality threshold.

5. The method of claim 4:
  wherein the evaluation criterion relates to received power;
  wherein subjecting the at least one reference signal to the evaluation criterion comprises comparing received power of the at least one reference signal to a power threshold; and
  wherein the quality threshold is a function of an average of the received power of all reference signals associated with antenna ports of the receiving radio device.

6. The method of claim 1:
  wherein the evaluation criterion relates to signal phase; and
  wherein subjecting the at least one reference signal to the evaluation criterion comprises comparing signal phase of the at least one reference signal to a phase threshold.

7. The method claim 1:
  wherein the at least one reference signal is represented by a set of time/frequency resources; and
  wherein the at least one reference signal is repeatedly subjected to the evaluation criterion for at least two occurrences of such sets of time/frequency resources.

8. The method of claim 1, further comprising receiving at least one further signal transmitted at at least one further antenna port of the transmitting radio device, and wherein the at least one further signal is used when determining whether the antenna port is deemed faulty or not.

9. The method of claim 1, further comprising receiving an acknowledgement of the reporting from the transmitting radio device.

10. The method of claim 1, further comprising, when the antenna port is deemed faulty, refraining from reporting that the antenna port is deemed faulty more than once.

11. The method of claim 1, further comprising, when the antenna port is deemed faulty, ignoring reception of further signals from the antenna port deemed faulty.

12. The method of claim 11, wherein the ignoring is triggered either by the receiving radio device or by the transmitting radio device.

13. The method of claim 1:
  wherein the transmitting radio device transmits the at least one reference signal on a plurality of antenna ports one at a time;
  wherein the determining is repeated for all antenna ports; and
  wherein the report indicates all those antenna port that are deemed faulty.

14. The method of claim 1, further comprising obtaining a request from the transmitting radio device to determine whether the antenna port is deemed faulty or not.

15. A radio device, acting as a receiving radio device, for reporting a faulty antenna port at a transmitting radio device, the radio device comprising:
 processing circuitry;
 memory containing instructions executable by the processing circuitry causing the radio device to:
  receive at least one reference signal transmitted at an antenna port of the transmitting radio device;
  determine whether the antenna port is deemed faulty or not by subjecting the at least one reference signal to an evaluation criterion; and
  when the antenna port is deemed faulty, reporting that the antenna port is deemed faulty.

16. The radio device of claim 15, wherein the memory contains further instructions executable by the processing circuitry causing the radio device to receive an acknowledgement of the reporting from the transmitting radio device.

17. The radio device of claim 15, wherein the memory contains further instructions executable by the processing circuit causing the radio device to, when the antenna port is deemed faulty, refrain from reporting that the antenna port is deemed faulty more than once.

18. The radio device of claim 15, wherein the memory contains further instructions executable by the processing circuit causing the radio device to, when the antenna port is deemed faulty, ignore reception of further signals from the antenna port deemed faulty.

19. The radio device of claim 18, wherein the ignoring is triggered either by the receiving radio device or by the transmitting radio device.

20. A non-transitory computer readable recording medium storing a computer program product for reporting a faulty antenna port at a transmitting radio device, the computer program product comprising software instructions which, when run on processing circuitry of a radio device acting as a receiving radio device, causes the radio device acting as a receiving radio device to:
 receive at least one reference signal transmitted at an antenna port of the transmitting radio device;
 determine whether the antenna port is deemed faulty or not by subjecting the at least one reference signal to an evaluation criterion; and
 reporting that the antenna port is deemed faulty.

* * * * *